No. 757,086. PATENTED APR. 12, 1904.
R. BOSSHARD.
STREET, STATION, PROGRAM, OR ADVERTISING INDICATOR.
APPLICATION FILED OCT. 23, 1902.
NO MODEL.
7 SHEETS—SHEET 1.
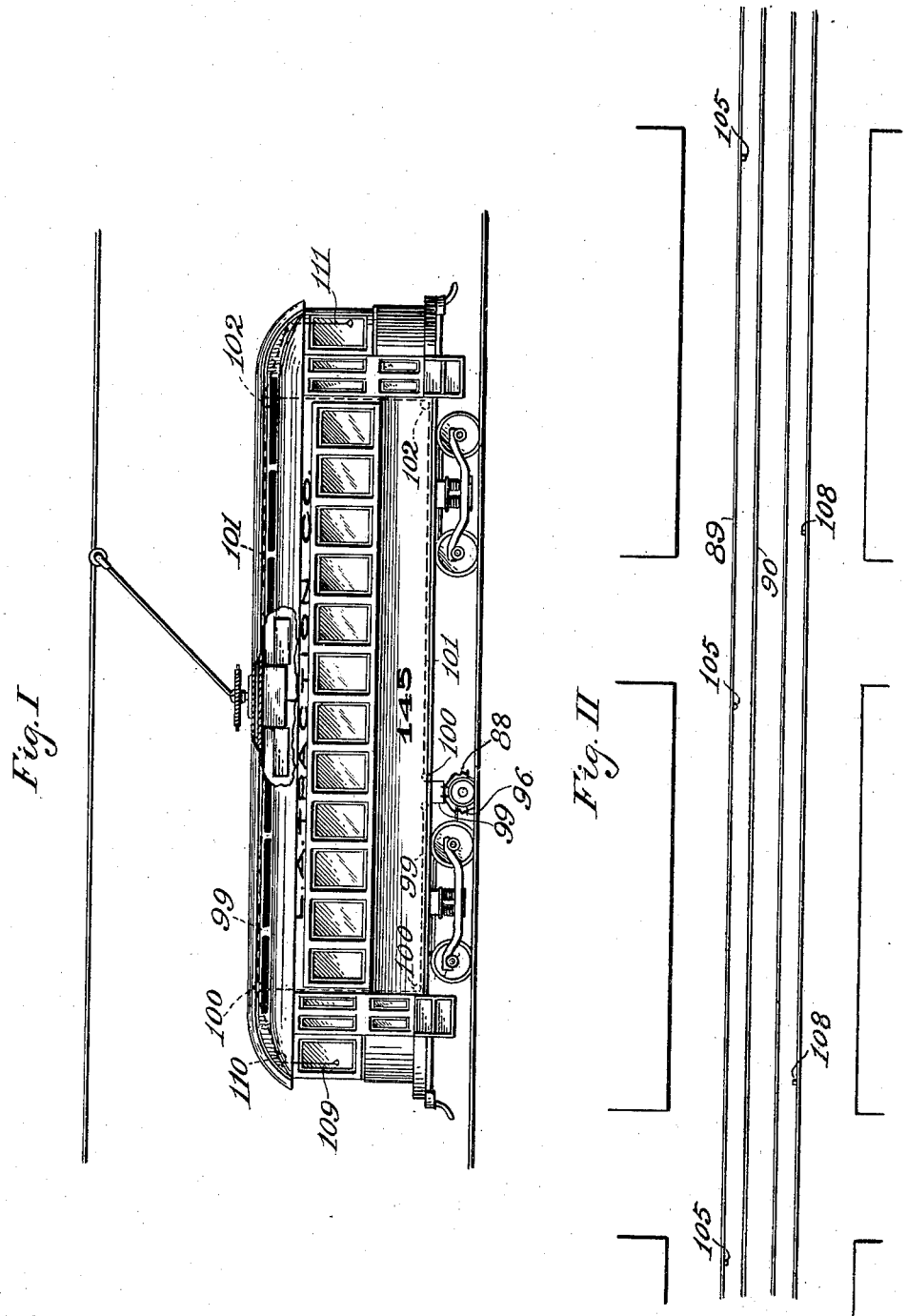
Witnesses
Inventor
Rudolph Bosshard.

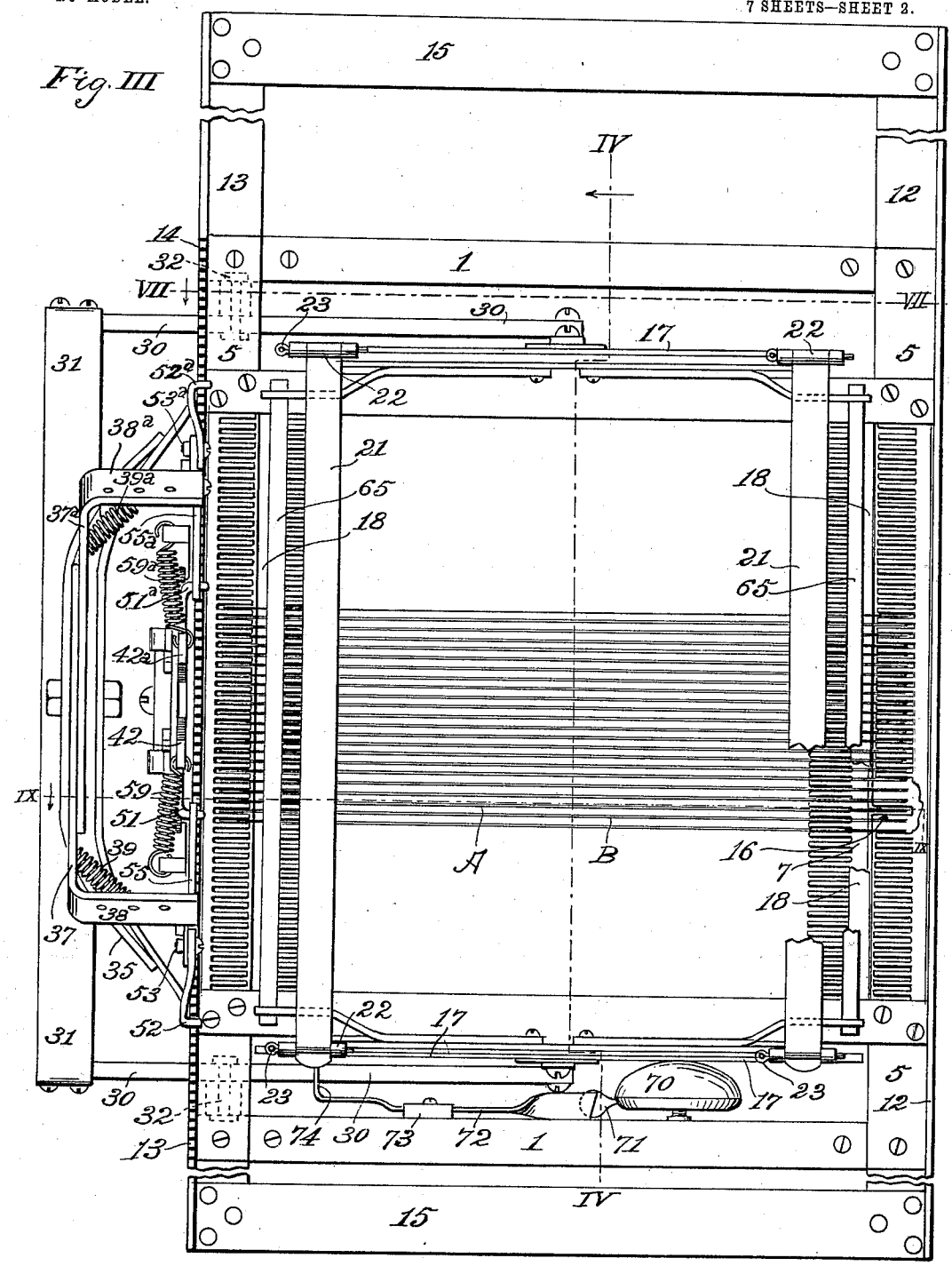

No. 757,086. PATENTED APR. 12, 1904.
R. BOSSHARD.
STREET, STATION, PROGRAM, OR ADVERTISING INDICATOR.
APPLICATION FILED OCT. 23, 1902.
NO MODEL. 7 SHEETS—SHEET 3.
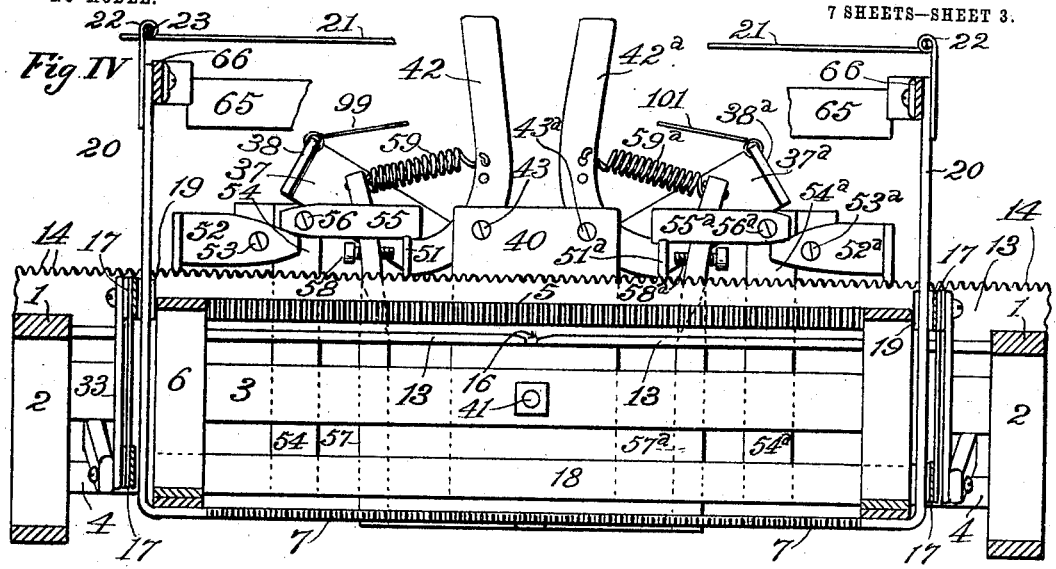
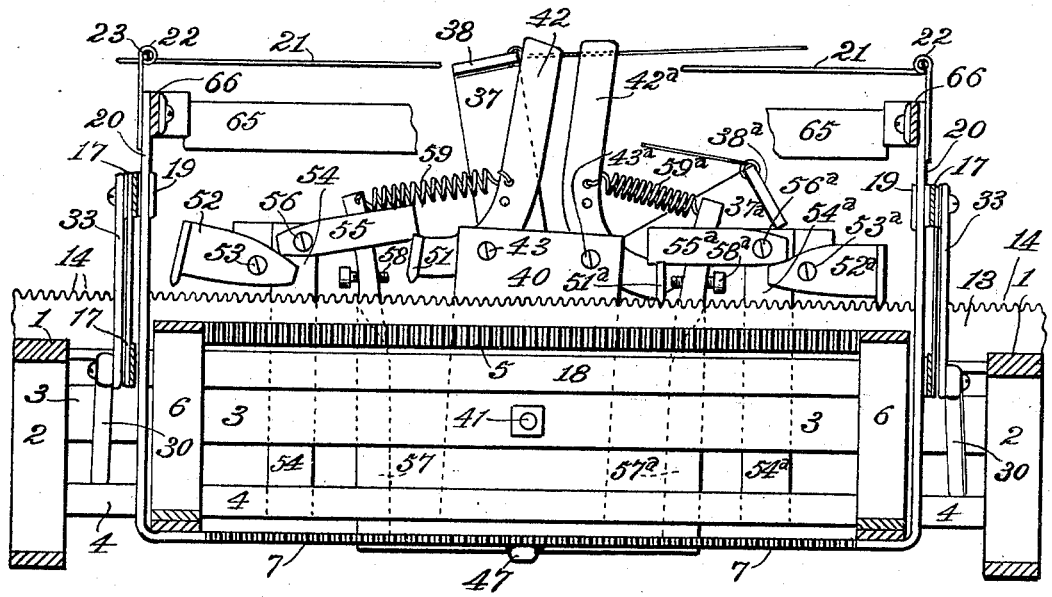
Witnesses
C. C. Holly
G. P. Hackley
Inventor
Rudolph Bosshard.
by Townsend Bro
his attys.

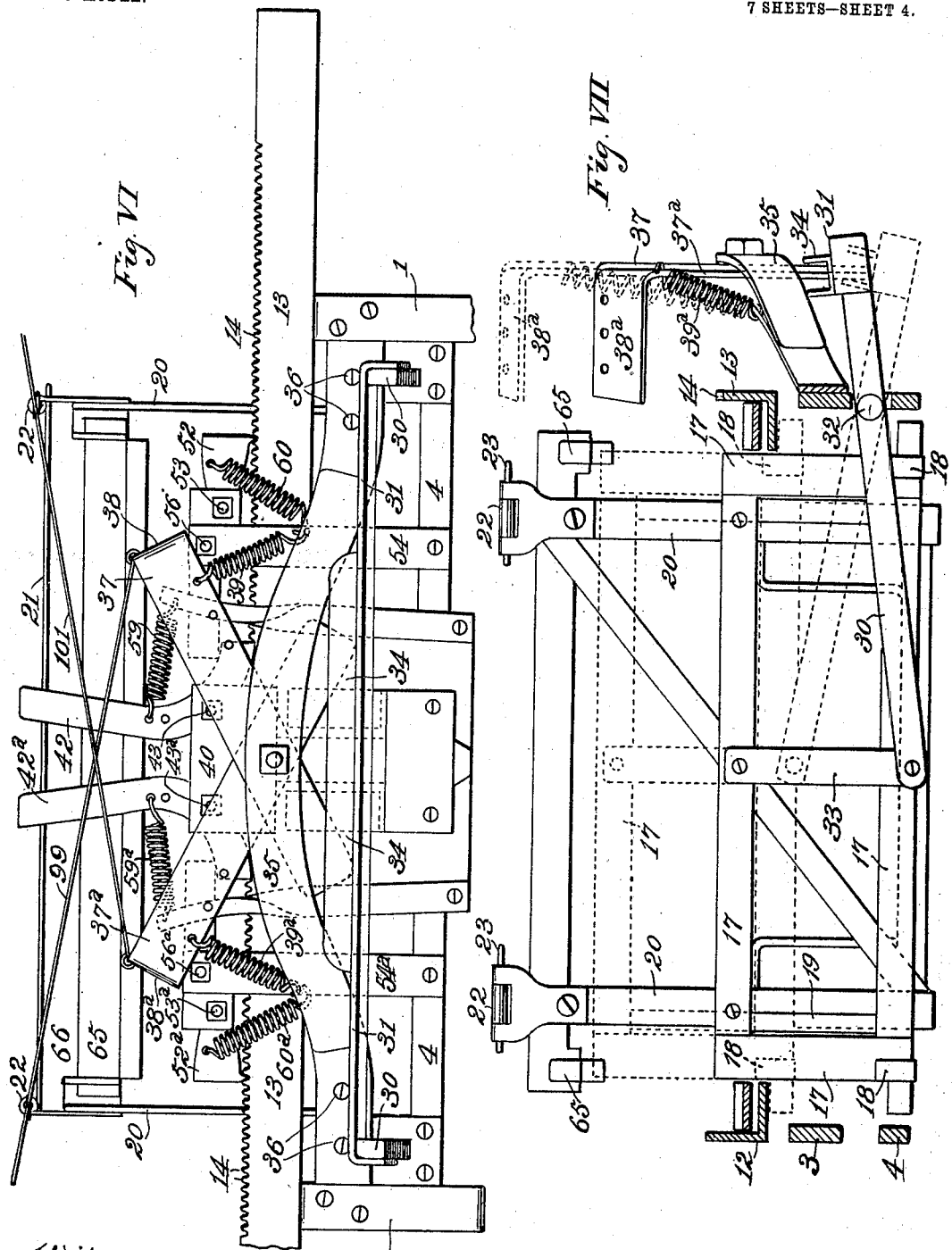

No. 757,086. PATENTED APR. 12, 1904.
R. BOSSHARD.
STREET, STATION, PROGRAM, OR ADVERTISING INDICATOR.
APPLICATION FILED OCT. 23, 1902.
NO MODEL. 7 SHEETS—SHEET 5.
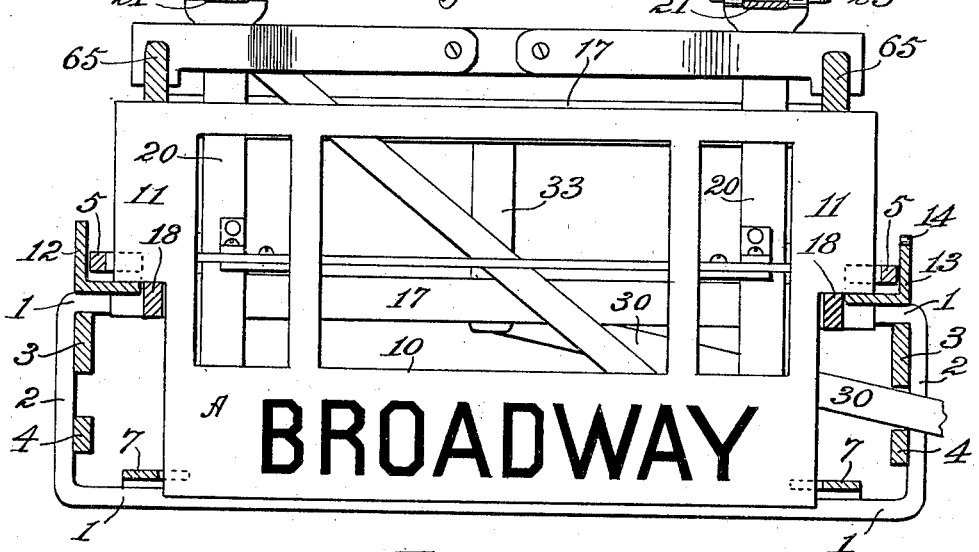
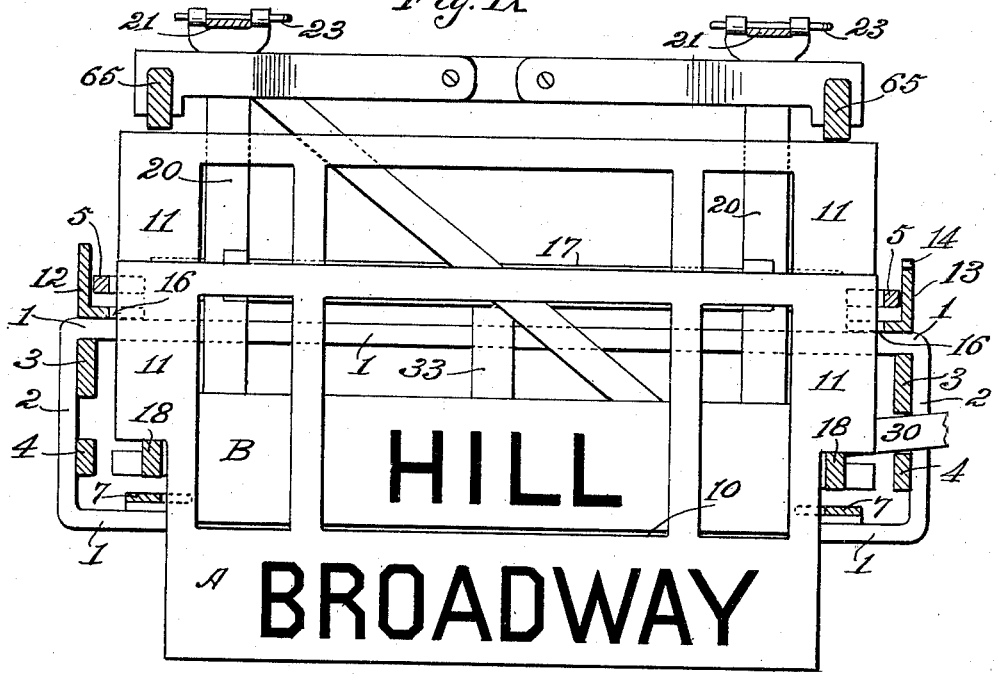
Witnesses
C. C. Holly
G. T. Hackley
Inventor
Rudolph Bosshard
by Townsend Bros
his attys.

No. 757,086. PATENTED APR. 12, 1904.
R. BOSSHARD.
STREET, STATION, PROGRAM, OR ADVERTISING INDICATOR.
APPLICATION FILED OCT. 23, 1902.
NO MODEL. 7 SHEETS—SHEET 6.
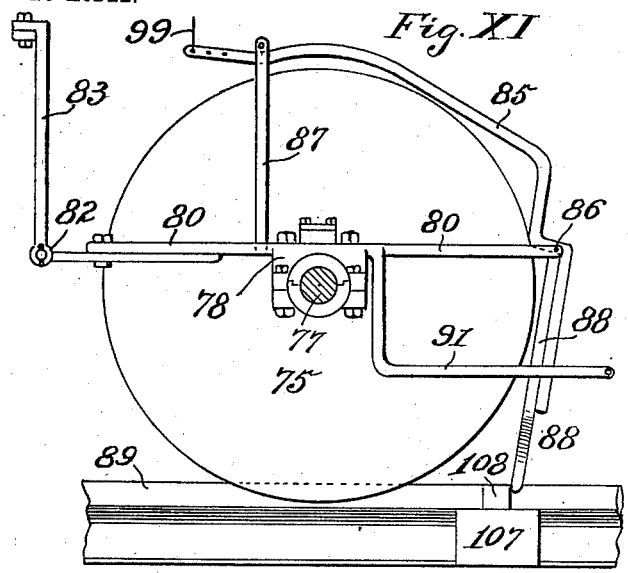
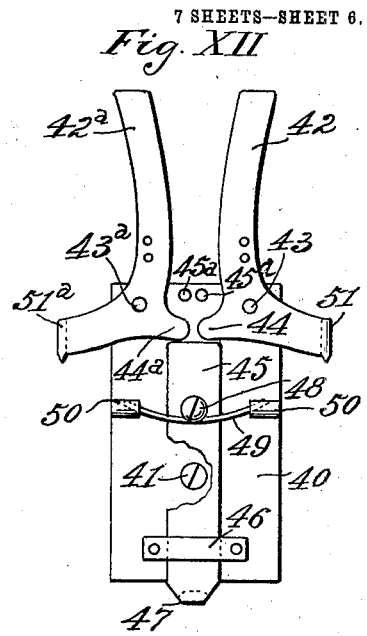
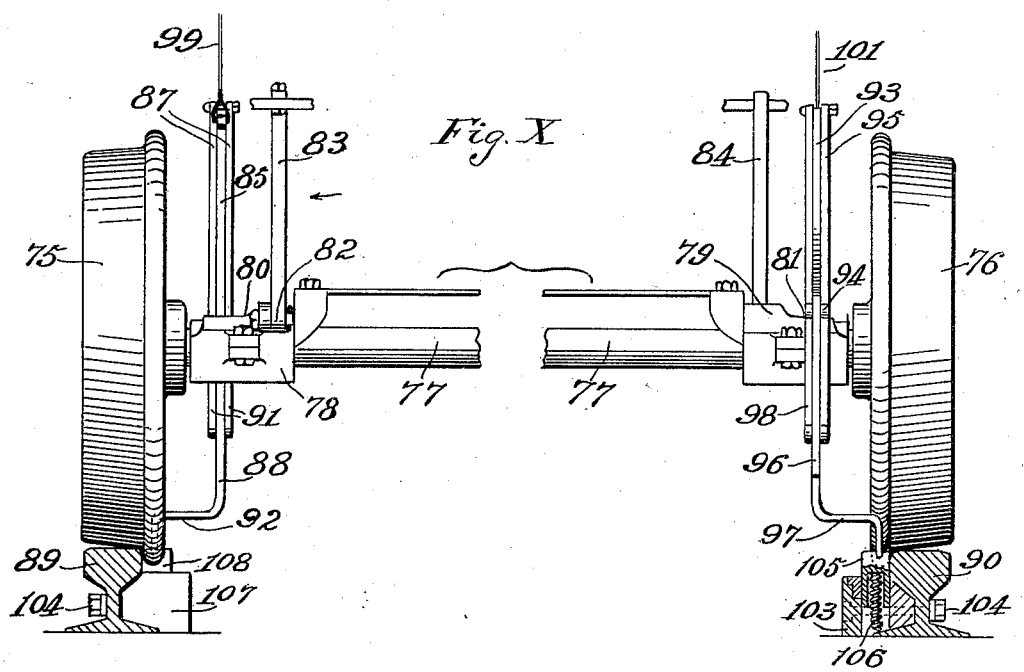
Witnesses
Inventor
Rudolph Bosshard No. 757,086. PATENTED APR. 12, 1904.
R. BOSSHARD.
STREET, STATION, PROGRAM, OR ADVERTISING INDICATOR.
APPLICATION FILED OCT. 23, 1902.
NO MODEL. 7 SHEETS—SHEET 7.
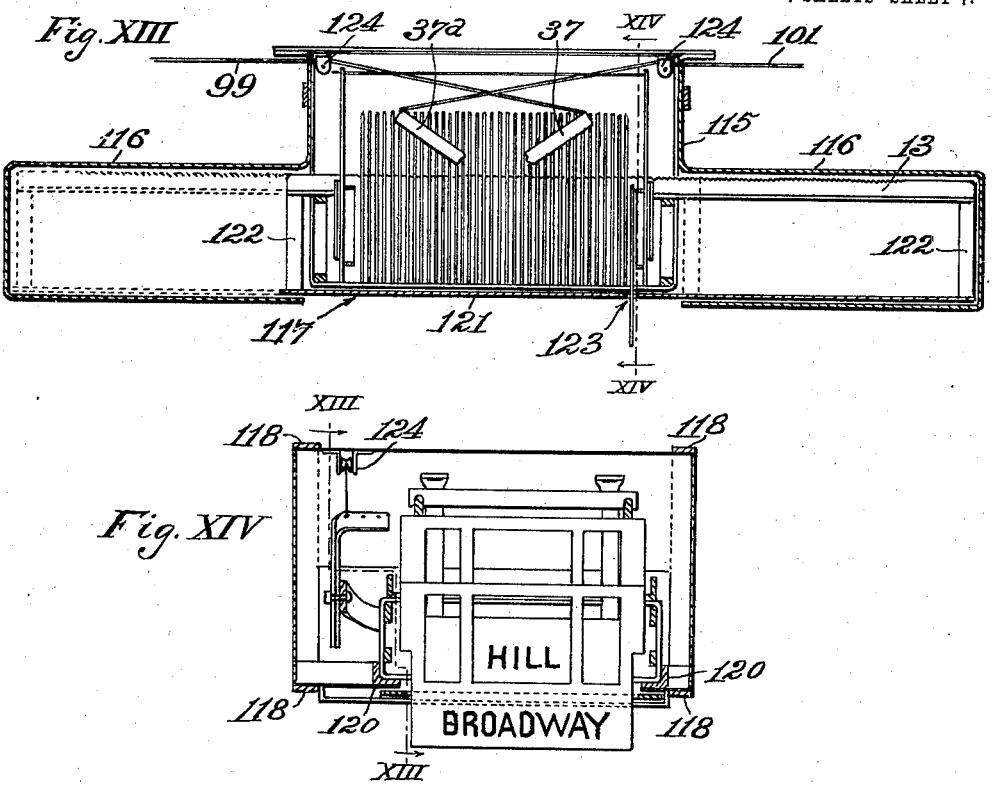
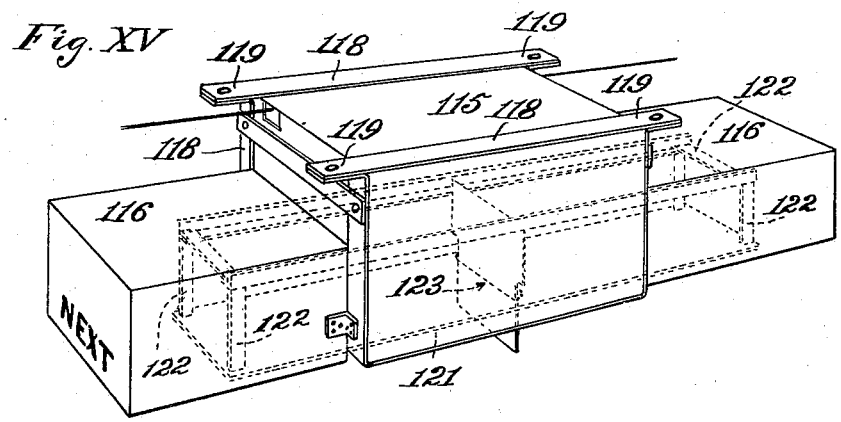
Witnesses
C. C. Holly.
G. T. Hackley.
Inventor
Rudolph Bosshard.
Townsend Bros
his atty.

No. 757,086. Patented April 12, 1904.

UNITED STATES PATENT OFFICE.

RUDOLPH BOSSHARD, OF LOS ANGELES, CALIFORNIA.

STREET, STATION, PROGRAM, OR ADVERTISING INDICATOR.

SPECIFICATION forming part of Letters Patent No. 757,086, dated April 12, 1904.

Application filed October 23, 1902. Serial No. 128,447. (No model.)

*To all whom it may concern:*

Be it known that I, RUDOLPH BOSSHARD, a citizen of the United States, residing at Los Angeles, in the county of Los Angeles and State of California, have invented a new and useful Street, Station, Program, or Advertising Indicator, of which the following is a specification.

My invention relates particularly to a device for automatically operating and bringing into view definite signs in consecutive order. By properly printing the signs the indicator is adapted to be used when carried by a street-car to indicate streets, or it may be used to indicate stations on the line of a railway. The indicator may also be adapted for use in theaters as a program device to indicate the different performances in consecutive order. When the signs are properly equipped with advertising matter, it may also be used for advertising purposes. The indicator may be employed exclusively for advertising purposes, or the advertisments could be placed on the signs in addition to the matter used in the other adaptations.

One object of my invention is to produce an indicator which is positive in action, having no rotary parts nor endless belts.

Another object is to provide an indicator in which the sign when displayed may be read from two different directions, each sign being a double sign—that is to say, each sign is lettered on both its front and back.

Another object is to provide an indicator in which different signs may be readily substituted for those in place and placed in any order desired and allowing the order or sequence of the signs to be quickly changed without taking the machine apart.

Another object is to provide a mechanism for automatically operating the indicator when it is used on railways.

Another object is to provide means whereby the indicator may be operated by hand.

The device essentially comprises a series of signs or cards which are arranged substantially in a pack, the mechanism projecting and retracting the cards in consecutive order in proper sequence from the pack. This is accomplished by providing a traveling frame which serves to support all of the cards, a slot in the traveling frame coming underneath one card after another, allowing the cards one after the other to drop, and a feeding mechanism for actuating this frame in both directions, so that the cards may be dropped in regular order or reverse order.

The invention also comprises a mechanism for raising a card after it has been dropped immediately before another card is dropped, so that there is only one card exposed to view at a time, which mechanism is in this embodiment operated by the feeding mechanism.

The invention also embodies an automatic tripping device which is useful when the indicator is used on street-railways.

In the drawings I have shown the device applied to a street-car; but, as has been before stated, it is applicable to other purposes.

When the indicator is used as a program-indicator, the automatic tripping device may be dispensed with.

Referring to the drawings, Figure I is a side elevation of a street-car equipped with the indicator, a portion of the car being broken away to show the position of the indicator in the car, the indicator in this view being inclosed in a box. Fig. II is a plan view of a street-railway track and shows the manner of arranging parts of the tripping device. Fig. III is a plan view of the invention in which only a few cards have been shown, other cards being omitted for purposes of illustration. Fig. IV is a section taken on the line IV IV of Fig. III looking in the direction of the arrow, the cards being removed, and shows the feeding mechanism in normal position. Fig. V is a view similar to Fig. IV, showing the operating parts of the feeding mechanism in another position. Fig. VI is a side elevation of what is shown in Fig. III looking toward the side of the machine upon which the feeding mechanism is arranged. In this view the cards are removed from the machine. Fig. VII is a sectional view taken on the line VII VII of Fig. III looking in the direction of the arrow. In this view only a part of the feeding mechanism is shown, the purpose of the view being to show an inside view of one end of the frame structure and the rock-frame which operates the card-retracting mechanism. Fig. VIII is a sectional view taken on the line IX IX of Fig. III looking in the direction of the arrow, the feeding mechanism being removed, the purpose of the view being to show the manner in which the cards are supported. Fig. IX is a view similar to Fig. VIII, all but one of the cards being shown in their retracted position, the nearest card being dropped. Fig. X is a view of a car-axle equipped with right-and-left tripping devices, one of the trigger devices attached to the rail being shown in sections. Fig. XI is a side elevation of a tripping device looking in the direction of the arrow, Fig. X, the axle being shown in section. Fig. XII is a detail view of a portion of the mechanism which actuates the traveling frame. Fig. XIII is a longitudinal section showing part of the frame and the cards in their relative position, the machine being inclosed by a box. The section is taken on line XIII XIII of Fig. XIV. Fig. XIV is a section taken through Fig. XIII on line XIV XIV. Fig. XV is a perspective view showing the box, the traveling frame of the indicator being shown in dotted lines. One card is shown in its dropped position in dotted lines.

All of the mechanism is connected to and carried by a stationary frame, which consists of open end pieces 1, which are united by vertical uprights 2. The end pieces are connected with each other by means of side bars 3. 4 designates narrower side bars which connect the lower portions of the end pieces 1. Each card is held in its own particular plane of movement by means of suitable combs.

5 designates an upper pair of combs, one of which is arranged on each side of the machine and each comb being rigidly connected to the frame by means of bars 6. Another pair of combs, 7, are provided on the lower part of the main frame and are connected at each end to the bars 6. The teeth of the upper comb engage the upper part of the cards, while the teeth of the lower comb 7 engage and guide the lower part of the cards.

Referring more particularly to Fig. VIII, 10 designates a card which is substantially rectangular in shape and the center portion of which is cut away in order to avoid weight, the printing being placed upon each side of the lower part of the card. Each end of the card has extensions 11, which afford shoulders for its support. The cards are supported or held in their raised or retracted position by means of a traveling frame, which comprises two angle-bars 12 and 13, which are L-shaped in cross-section. The angle-bar 13 is provided at its upper edge with teeth 14. The angle-bars 12 and 13 are each connected at each end by cross-bars 15. The angle-bars 12 and 13 are each provided at the middle of their length with lateral slots 16. (See Figs. III, IV, and IX.) The cards are held between the teeth of the combs, and the extensions 11 of each card rest upon the horizontal flange of the angle-bars 12 and 13. As the traveling frame is advanced step by step underneath the cards when the slots 16 are brought into register with opposite teeth of the combs 5 the extensions 11 of the cards enter the slots 16 and the card is allowed to drop into the position shown in Fig. IX. Upon the next action of the indicator the card is first raised (by the mechanism to be hereinafter described) and the traveling frame advances to bring the slots 16 under the next card, which is then allowed to drop, and so on. The traveling frame rests upon the top of the end pieces 1 and is guided by the outside edges of the combs 5. (See Figs. VII and VIII.) For supporting a card which is dropped and for raising the card after it has been displayed I provide a vertically-movable carriage, which consists of end frames 17, connected by side bars 18. (See Figs. III, VII, VIII, and IX.) This frame is slidably mounted, as at 19, (see Figs. IV and V,) to vertical uprights 20, which are attached to the lower combs 7. The upper ends of the uprights 20 are united by link straps 21. The straps 21 are connected at one end by hinges 22 with one set of uprights 20, and at the other end they are connected to the other set of uprights by pins 23, which pass through eyes in the straps. By removing the pins 23 the straps 21 may be swung out of the way to allow of the cards being withdrawn from the combs. The vertically-movable carriage is operated by means of a U-shaped rock-frame comprising side arms 30 and a connecting-bar 31. The side arms 30 of the rock-frame are pivoted, as at 32, to the end pieces 1 of the frame. The side bars 30 of the rock-frame are connected to the end pieces 17 of the vertically-movable frame by means of links 33, and as the rock-frame is tilted the vertically-movable frame is moved. In Fig. VII the vertically-movable frame is shown as moved up by the rock-frame, the position of the parts being shown in dotted lines. Upon the upper face of the bar 31 is a trough 34.

35 is a bracket fastened to the main frame of the machine, as at 36, and pivoted to the bracket 35 are a pair of levers 37 and $37^a$. The upper ends of the levers 37 and $37^a$ are bent at right angles to form wings 38 and $38^a$. Springs 39 and $39^a$ connect the wings 38 and $38^a$ with the bracket 35 and serve to hold the levers 37 $37^a$ in normal position, as shown in Fig. VI.

Referring now more particularly to Figs. IV, V, and XII, 40 designates a wrist-plate which is pivoted at 41 to one of the bars 3. 42 is a bell-crank lever pivoted at 43 to the wrist-plate 40. The bell-crank lever 42 is provided with a toe 44. 45 is a sliding plate which is guided by a strap 46, fastened to the wrist-plate, and has at its lower end a lug 47, which serves as a stop to limit the upward movement of the plate 45. 48 is a screw projecting from the plate 45. 49 is a flat spring which is attached at 50 to the wrist-plate, and the middle portion of the spring 49 bears against the screw 48 and serves to hold the plate 45 in its raised position with the lug 47 in contact with the lower edge of the wrist-plate. 45ª designates a pair of studs which project from the wrist-plate. The lower arm of the bell-crank lever 42 is provided with a detent 51, which normally engages with the teeth 14 of the angle-bar 13. 52 is a detent pivoted at 53 to a stationary upright 54, which extends from the main portion of the frame. 55 is an intermediate lever pivoted at 56 to the upright 54. One end of the intermediate lever 55 rests upon the inner end of the detent 52, while the other end of the intermediate lever 55 is in contact with the detent 51. 57 is a stationary post which extends up from the main frame and which is provided with an adjustable stop 58 for limiting the tilting of the wrist-plate by reason of the detent 51 striking against it. The bell-crank lever 42 is connected with the upper end of the post 57 by a spring 59. The upper end of the bell-crank lever 42 lies in the path of movement of the wing 38 of the lever 37. The detent 52 is normally held in engagement with the teeth 14 by means of a spring 60. (See Fig. VI.) 42ª is another bell-crank lever pivoted at 43ª to the wrist-plate 40. 51ª is a detent carried by the bell-crank lever 42ª. 52ª is a detent pivoted at 53ª to an upright 54ª. 55ª is an intermediate lever pivoted at 56ª to the upright 54ª. 57ª is a stationary upright post connected with the main frame of the machine. 58ª is an adjustable stop carried by the post 57ª for limiting the tilting of the wrist-plate by reason of the detent 52ª striking against it. 59ª is a spring extended between the upper end of the post 57ª and the bell-crank lever 42ª. The spring connected with the detent 52ª holds it normally in engagement with the teeth 14.

In order to hold the cards down in position and prevent them from trembling or jarring up, I employ a pair of frames 65, which are pivoted to bear upon the upper edges of the cards.

70 designates a bell provided with an actuating-finger 71.

72 is a lever pivoted at 73 to the end pieces 1. One end of the lever 72 is bent, as at 74, and lies directly in the path of movement of an arm 30 of the rock-frame, so that as the rock-frame is tilted the arm 30 contacts with the lever 72 and the latter is rocked and depresses the actuating-finger 71, thus ringing the bell every time the rock-frame is tilted and a card dropped.

The operation of the device thus far described is as follows: By pulling the lever 37 the bell-crank lever 42 is thrown into the position shown in Fig. V. The detent 51 is withdrawn from the teeth 14 and its upper edge bearing against the intermediate lever 55 and tilting the same, the lever 55 in turn tilting the detent 52 and disengaging it from the teeth 14. As the bell-crank lever 42 is tilted its toe 44 presses down the plate 45 and flexes the spring 49. (See Fig. XII.) Continued movement of the bell-crank lever 42 causes it to strike against one of the lugs 45ª, which results in tilting the wrist-plate 40 upon its pivot 41, and as the wrist-plate 40 is tilted the detent 51ª advances the traveling frame until the detent 51ª strikes against the stop 58ª, which allows a movement of the bell-crank lever 42 sufficient to advance the traveling frame the space of one tooth. Upon releasing the bell-crank lever 42 the spring 59 retracts it and causes the detent 51 to drop into another tooth, the intermediate lever 55 at the same time falling by gravity and allowing the detent 52 to again engage another tooth. The detent 51ª is also raised, and thereby the detent 52ª, and the detent 51ª is brought back and allowed to drop back of the succeeding tooth, the detent 51ª being pushed up by the inclined face of the succeeding tooth, behind which it drops by gravity. When it is desired to move the traveling frame in the other direction to cause the cards to be exposed in the reverse sequence, the bell-crank lever 42ª is rocked, which frees detents 51ª and 52ª, and detent 51 pushes the angle-bar 12 in the other direction, the pawl 52 being raised by the inclined face of the succeeding tooth, behind which it drops when the angle-bar is advanced. The desired cards containing the proper signs may be placed in regular sequence between the combs, as shown in Fig. III. By pulling over the lever 37 the detents 51 and 52 are first raised from the teeth 14, and further movement of the lever 37 rocks the bell-crank lever 42, which rocks the wrist-plate 40 and pushes over the detent 51ª, advancing the carriage a distance the space of one tooth. As the lever 37 is thus moved its lower end within the trough 34 bears upon the rod 31 and tilts the rock-frame, thereby moving the vertically-movable frame up into the position shown in dotted lines in Fig. VII. The vertically-movable frame is moved up until the bars 18 rest upon the shoulders of the wings 11 of the cards. It will be assumed that this movement of the lever 38 has caused the traveling carriage to be advanced into the position shown in Fig. III with the slots 16 moved into a position to allow the card designated A to be dropped. Upon releasing the lever 37 the spring 59 pulls back the bell-crank lever 42, throws the detents 51 and 52 into engagement with the teeth 14, and holds the traveling carriage in the position shown in Fig. III. The card A is dropped after the slots 16 have been brought into alinement underneath the same, and as the vertically-movable carriage moves down the card slips down through the slots as fast as the bars 18 will allow. This card A is displayed for the proper interval, and when it is desired to display the next card the lever 37 is again pulled into the position shown in Fig. V, which causes the rock-frame to be tilted, which in turn moves up the vertically-movable frame and carries up the card A which has just been displayed, the traveling frame remaining stationary during the upward movement of the card. The movement of the lever 37 before it strikes and contacts with the lever 42 is devoted to raising the vertically-movable frame, so that by the time the lever 37 comes into contact with the bell-crank lever 42 the card will have been raised out of the slot 16, and further movement of the lever 37 will tilt the wrist-plate 40 and advance the traveling frame the space of one tooth from the detents 51ᵃ and 52ᵃ. This brings the slots 16 underneath the next card, (designated B,) and when the lever 37 is released the detents 51 and 52 first engage the teeth 14 and the traveling frame is held from movement, and the further downward movement of the lever 37 is accompanied by the downward movement of the vertically-movable frame, which allows the second card, B, to drop with it. The foregoing-described operation being repeated causes one card after another in proper sequence to be dropped, displayed, and raised. If it is desired to display the cards in order the reverse of that which has just been described, the lever 37ᵃ will be operated instead of the lever 37, which will cause a reverse movement of the traveling frame, the slots 16 being moved underneath the cards in a reverse direction.

*Automatic tripping mechanism.*—75 and 76 are a pair of wheels united by an axle 77. The axle 77 is carried by journals 78 and 79.

80 and 81 are frames which carry the journals 78 and 79, respectively. The frames 80 and 81 are pivotally connected at 82 with vertical bars 83 and 84, which bars are bolted to one of the trucks of the car.

85 is an L-shaped tripping-lever, which is pivoted at 86 to one end of the frame 80. The upper end of the tripping-lever 85 passes between a pair of guides 87, which guides extend vertically from the frame 80.

88 is a finger, also pivoted at 86 to the frame 80 and lies parallel with and in contact with the lower end of the tripping-lever 85, the lower end of the finger projecting considerably below the lower end of the tripping-lever 85 into a point slightly below the upper surface of the track-rails, which are designated by 89 and 90. The finger 88 and lower end of the tripping-lever 85 are prevented from lateral movement by a guide-frame 91, which is attached to the journal 78. The lower end of the finger 88 is provided with an offset 92.

93 is an opposite tripping-lever pivoted at 94 to the frame 81. The upper end of the tripping-lever 93 is prevented from lateral movement by a guide 95, which is similar to the guide 87 and which is carried by the frame 81.

The finger 96 is offset, as at 97, to bring its lower end into a position in front of the flange of the wheel 76 and into a point slightly below the upper surface of the track-rail 90. The lower end of the tripping-lever 93 and the finger 96 are prevented from lateral movement by a guide-frame 98, which is connected to the frame 81. The tripping-lever 93 is formed reversely of the tripping-lever 85 and extends out the other side of the axle 77. The finger 96 is also formed in a reverse manner from the finger 88, while the guide 98 extends in an opposite direction from the axle 77 to the guide 91, the guide 95 also lying upon the opposite side of the axle 77 from the guide 87. Thus there are two tripping devices carried by the journals 78 and 79, which are formed in "rights and lefts" to provide for tripping the indicator when the car is going in either direction.

One end of the lever 85 may have attached thereto a cord 99, which may pass over suitable sheaves 100, which are carried by the car, the other end of the cord being attached to the lever 87. 101 is another cord which may be attached to the end of the tripping-lever 93 and which may pass over suitable sheaves 102, carried by the car, the other end of the cord 101 being attached to the lever 37ᵃ.

At suitable intervals along the track-rails I place devices for engaging the fingers 92 and 97 and for tilting the same. These tripping devices are preferably placed on the track-rails at points adjacent cross-streets, as shown in Fig. II.

Referring to Fig. X, 103 designates a block which may be fastened to the track-rail 90 by means of a bolt 104. The block 103 is recessed, and slidably mounted therein is a plunger 105. The plunger 105 is cupped at its lower end to receive a coiled compression-spring 106. The spring 106 holds the plunger 105 in a raised position, so that its upper end will lie directly in the path of travel of the finger 97, and when the car comes along the finger 97 is moved against the plunger 105, which causes the finger 97 to be rocked and the tripping-lever 93 also rocked upon its pivot 94, which pulls the cord 101, and thus draws over the lever 37ᵃ and the indicator thereby operated. The flange of the wheel 76 depresses the plunger 105 as the wheel passes over the plunger 105, springing back into position in time to engage the finger 97.

The tripping-lever 85 is worked in a manner similar to the tripping-lever 93 just described by a tripping device on the opposite track-rail 89, in which 105 designates the block and 108 designates the plunger.

In Fig. XI the finger 88 is shown as having been brought in contact with the plunger 108, and upon the further movement of the car to carry the wheel 75 to the left finger 88 will be rocked and the tripping-lever 85 thereby tilted upon its pivot 86, which will draw upon the cord 89 and actuate the lever 37, thereby operating the indicator.

By arranging a tripping device on the track-rails at a point adjacent every street, as shown in Fig. II, the indicator will be operated when the car approaches each cross-street.

If desired, the indicator may be operated by a hand-pull 109, which passes over a suitable sheave 110, carried by the car, and also connects with the lever 37. The lever 37ª may be equipped with a similar hand-pull 111, which is shown at the other end of the car in Fig. I.

It is obvious that the tripping device may be arranged at any desired point along the track-rails. Fig. II shows one arrangement in which the indicator will be caused to designate the proper name of the street, showing it before the car approaches that street.

The fingers 88 and 96 are constructed so that they may be swung freely in the direction the reverse of their operative direction of movement.

The automatic tripping device may be dispensed with, if desired, and the indicator may be operated by the conductor of the car by pulling either of the hand-pulls 109 or 110.

Referring to Fig. XIII, 115 designates a rectangular box, which is provided at each end with rectangular-shaped wings 116. The bottom of the box 115 is open, as at 117, and may preferably be strengthened or braced by means of bands 118. The upper bands 118 extend beyond each end of the box to form lugs 119, which may be perforated, as shown, to allow the box to be fastened to the roof of a car or other support.

Referring to Fig. XIV, 120 designates angle-bars which are inside the box 1 and upon which the main frame of the indicator may rest.

In order to keep the bottom of the box 115 closed, I have provided a rectangular plate 121, which is connected with the traveling frame by means of four posts 122. The plate 121 is provided with a slot 123 about midway of its length and is suspended slightly above the bottom of the box-like wings 116. The slot 123 lies in line with the slots 16 in the angle-bars of the traveling frame. When the traveling frame is moved along, the plate 121 is carried with it and the slot 123 brought under each card before the card drops. The plate is of sufficient length to cover the opening 117 when the traveling frame is at either end of its travel. Thus the opening 117 is always closed and the indicator completely inclosed.

124 designates sheaves, which may be arranged at each end of the upper parts of the box 115 to form guides for the cords 99 and 101. If it is desired to lead both cords out of the same end of the box, it may be done by a simple arrangement of the sheaves. It might be desirable to have both cords run to one end of the car, so as to be within reach of the conductor or motorman.

It is obvious that many variations and changes may be made in the herein-described embodiment without departing from the spirit of my invention.

Now, having described my invention, what I claim, and desire to secure by Letters Patent of the United States, is—

1. In an indicator, means for confining a series of cards in substantial pack form, a vertically-movable frame mounted on said means away below the pack of cards, means for allowing a card to drop against the movable frame, and means for actuating the movable frame toward the pack and restoring the card.

2. In an indicator, means for confining a series of cards in substantial pack form, a vertically-movable frame mounted on said means away below the pack of cards, means for allowing said cards to drop sequentially onto the vertically-movable frame, and means for actuating the movable frame toward the pack and restoring each card after being exposed.

3. In an indicator, a main frame, a traveling frame slidably mounted on said main frame, a series of cards supported by said traveling frame, means to hold said cards stationary, said traveling frame being provided with a pair of opposite slots, a vertically-movable frame extending along under each card and means to propel said traveling frame and bring said slots under said cards step by step, and allowing the cards to drop sequentially onto the vertically-movable frame, and means for raising the vertically-movable frame and restoring the cards.

4. In an indicator, a main frame, a traveling frame slidably mounted on said main frame, said traveling frame being provided with a pair of opposite slots, a series of cards supported by said traveling frame, combs mounted on said main frame and engaging said cards, a vertically-movable frame extending along under each card and means to move said traveling frame and bring said slots under said cards step by step, and allowing the cards to drop sequentially onto the vertically-movable frame, and means for raising the vertically-movable frame and restoring the cards.

5. In an indicator, a main frame, a traveling frame slidably mounted on said main frame, said traveling frame having a pair of oppositely-arranged slots, a series of cards supported by said traveling frame, a plurality of combs connected to said main frame, one pair of combs engaging said cards on one edge, and another pair of combs engaging said cards on their opposite edges, means for propelling said traveling frame step by step, a vertically-movable frame extending along under each card, and means for raising said vertically-movable frame.

6. In an indicator, a main frame, a traveling frame slidably mounted on said main frame, said traveling frame having a pair of oppositely-arranged slots, a series of cards supported by said traveling frame, a plurality of combs connected to said main frame, one pair of combs engaging said card on one edge, another pair of combs engaging said cards on their opposite edges, and means to propel said traveling frame and bring said slots into register with the bottom edges of said cards step by step, a vertically-movable frame extending horizontally along under each card away below the cards, and means for raising the vertically-movable frame.

7. In an indicator, a main frame, a traveling frame slidably mounted on said main frame, a series of cards supported by said traveling frame, said traveling frame being provided with opposite slots, means to propel said traveling frame and bring said slots under said cards step by step, and means for retracting said cards, said last means embracing a vertically-movable rectangular frame under said cards, parallel therewith, and spaced apart therefrom.

8. In an indicator, a main frame, a traveling frame slidably mounted on said main frame, a series of cards supported by said traveling frame, said traveling frame being provided with means which allow a card to project by said traveling frame, and means for propelling said traveling frame in two directions and bring said slots under said cards step by step, a vertically-movable rectangular frame under said cards, spaced apart therefrom and means for raising said vertically-movable frame.

9. In an indicator, a main frame, a traveling frame slidably mounted on said main frame, a series of cards supported by said traveling frame, said traveling frame being provided with a pair of oppositely-arranged slots, means to propel said traveling frame in two directions and bring said slots under said cards step by step, a vertically-movable rectangular frame under said cards, spaced apart therefrom, and means for raising said vertically-movable frame.

10. In an indicator, a main frame, a traveling frame slidably mounted on said main frame, a series of cards supported by said traveling frame, said traveling frame being provided with a pair of oppositely-arranged slots, means to propel said traveling frame in two directions and bring said slots under said cards step by step, thereby allowing said cards to drop sequentially, and means to retract a card after it has been dropped, said last means embracing a vertically-movable rectangular frame under said cards, parallel therewith, and spaced apart therefrom.

11. In an indicator, a main frame, a traveling frame slidably mounted on said main frame, a series of cards supported by said traveling frame, said traveling frame being provided with means for allowing a card to drop through said frame, means to propel said traveling frame under said cards, thereby allowing said cards to drop in consecutive order, and means for producing an audible signal when a card is dropped, a vertically-movable rectangular frame under said cards, spaced apart therefrom, and means for raising said vertically-movable frame.

12. In an indicator, a main frame, a traveling frame mounted on said main frame, a series of cards supported by said traveling frame, said traveling frame being provided with means for allowing a card to drop through said frame, a vertically-movable frame mounted on said main frame underneath said cards, means to propel said traveling frame step by step and allow said cards to drop sequentially, and means for raising said vertically-movable frame.

13. In an indicator, a main frame, a traveling frame mounted on said main frame, a vertically-movable frame on said main frame, a series of cards supported by said traveling frame, said traveling frame being provided with means for allowing a card to drop through said traveling frame, means for propelling said traveling frame in two directions underneath said cards and allowing said cards to drop sequentially, and means for raising said vertically-movable frame.

14. In an indicator, a main frame, a traveling frame comprising a pair of oppositely-arranged angle-bars, end bars connected to said angle-bars, one of said angle-bars being provided with teeth on its upper edge, a series of cards supported by said angle-bars, a detent engaging said teeth, and means for operating said detent, each of said angle-bars being provided with a slot, said slots being arranged opposite each other.

15. In an indicator, a main frame, a traveling frame comprising a pair of angle-bars which are connected at each end, one of said angle-bars being provided with teeth upon its upper edge, both of said angle-bars being provided with opposite slots, a detent engaging said teeth, means for operating said detent, a series of vertical cards resting upon the angle-bars, and means for raising said cards.

16. In an indicator, a main frame, a traveling frame comprising a pair of angle-bars, one of said bars being toothed, a detent engaging the teeth on said bar, a series of vertical cards supported by said angle-bars, means for operating said detent and propelling said traveling frame to bring said slots under said cards and allowing said cards to drop sequentially, a vertically-movable frame mounted on said main frame, and means for operating said vertically-movable frame.

17. In an indicator, a main frame, a traveling frame mounted on said main frame, a series of cards supported by said traveling frame, said traveling frame being provided with means for allowing a card to drop through said traveling frame, a series of teeth on said traveling frame, a detent engaging said teeth, means for operating said detent and thereby moving said traveling frame by said cards and allowing said cards to drop in consecutive order, a vertically-movable frame carried by said main frame, and means for raising said vertically-movable frame immediately before a card is dropped.

18. In an indicator, a main frame, a traveling frame comprising a pair of angle-bars connected at each end, a series of cards, said cards being provided with shoulders on each end, said shoulders resting upon said angle-bars, said angle-bars being provided with slots, and means for moving said traveling frame and bringing said slots under the shoulders of one card at a time.

19. In an indicator, a main frame, a traveling frame comprising a pair of angle-bars connected at each end, a series of cards, each of said cards being provided with shoulders on each end, said shoulders resting upon said angle-bars, said angle-bars being provided with slots, means for moving said traveling frame and bringing said slots under one card at a time, and means for raising a card after it has been dropped.

20. In an indicator, a main frame, a traveling frame mounted on said main frame, said traveling frame being provided with teeth, a detent engaging said teeth, said traveling frame being provided with means for allowing a card to drop therethrough, means for operating and propelling said traveling frame, a series of cards supported by said traveling frame, and another frame pivoted to the main frame and resting upon the upper edges of said cards.

21. In an indicator, a main frame, a traveling frame mounted on said main frame, a series of cards supported by said traveling frame, said traveling frame being provided with means for allowing a card to drop therethrough, means for propelling said traveling frame in two directions and allowing said cards to drop sequentially, means for raising said cards, and means bearing by gravity upon the upper edges of said cards to assist in holding said cards upon the traveling frame.

22. In an indicator, a main frame, a traveling frame mounted thereon, a series of cards supported by said traveling frame, said traveling frame being provided with means for allowing said cards to drop sequentially, a vertically-movable frame underneath said cards, means for raising said vertically-movable frame, a rock-frame pivoted to the main frame, said rock-frame being connected to said movable frame by links.

23. In an indicator, a main frame, a traveling frame mounted on said main frame, a series of cards supported by said traveling frame, said traveling frame being provided with means for allowing a card to drop therethrough, a bracket carried by said frame, a lever pivoted to said bracket, said traveling frame being provided with teeth, a detent engaging said teeth, means intermediate said detent and said lever for actuating said detent when said lever is rocked, said detent adapted to move said traveling frame along said cards and allow the same to drop in consecutive order.

24. In an indicator, a main frame, a traveling frame mounted on said main frame, a series of cards supported by said traveling frame, said traveling frame being provided with means for allowing a card to drop therethrough, a bracket carried by said main frame, a lever pivoted to said bracket, said traveling frame being provided with teeth, a detent engaging said teeth, means intermediate said detent and said lever for actuating said detent when said lever is rocked, said detent adapted to move said traveling frame along said cards and allow the same to drop in consecutive order, and means for raising said cards.

25. In an indicator, a main frame, a traveling frame mounted thereon, a series of cards supported by said traveling frame, said traveling frame being provided with means for allowing a card to drop therethrough, a series of teeth on said traveling frame, a bracket on said main frame, a lever pivoted to said bracket, a wrist-plate pivoted to said main frame, a bell-crank lever pivoted to said wrist-plate, a detent engaging said teeth, connections between said detent and said bell-crank lever, said bell-crank lever lying in the path of movement of said first-named lever, and means for raising said cards embracing a rock-frame, one end of said first-named lever resting upon said rock-frame.

26. In an indicator, a main frame, a traveling frame provided with teeth, a series of cards supported by said traveling frame, the traveling frame being provided with means for allowing a card to drop therethrough, a bracket on said main frame, a lever pivoted to said bracket, the upper end of said lever being offset, a wrist-plate pivoted to said main frame, a bell-crank lever carried by said wrist-plate, a detent engaging the teeth of said traveling frame, connections between said detent and said bell-crank lever, and means for raising said cards embracing a rock-frame, one end of said first-named lever being in contact with a portion of said rock-frame, the offset of said lever lying a short distance from the bell-crank lever.

27. In an indicator, a main frame, a traveling frame slidably mounted thereon and provided with a pair of slots, a series of cards supported by said traveling frame, a vertically-movable frame embracing end pieces united by side bars, a rock-frame pivoted to the main frame, links connecting said rock-frame with said end pieces, and means for first operating said rock-frame and then advancing said traveling frame.

28. In an indicator, a main frame, a traveling frame mounted on said main frame and provided with opposite slots, a series of cards vertically supported by said traveling frame, a pair of combs carried by the main frame and holding said cards from sidewise movement, a vertically-movable frame, and means for raising said vertically-movable frame and then advancing said traveling frame.

29. In an indicator, a main frame, a traveling frame mounted on said frame and provided with opposite slots, a series of cards vertically supported by said traveling frame, a pair of combs carried by the main frame and holding said cards from sidewise movement, a vertically-movable frame, and means for raising said vertically-movable frame and then advancing said traveling frame, and then lowering said vertically-movable frame while said traveling frame is advancing.

30. In an indicator, a main frame, a traveling frame slidably mounted thereon and provided with a pair of slots, a series of cards supported by said traveling frame, a bracket on said main frame, a lever pivoted to said bracket, a wrist-plate pivoted to said main frame, a bell-crank lever pivoted to said wrist-plate, a post on said main frame, an intermediate lever pivoted on said post, a second detent pivoted to said post and engaging said intermediate lever, both of said detents engaging the teeth of said traveling frame, and said bell-crank lever lying in the path of movement of said first-named lever.

31. In an indicator, a main frame, a traveling frame slidably mounted thereon and provided with a pair of slots, a series of cards supported by said traveling frame, a bracket on said main frame, a lever pivoted to said bracket, a wrist-plate pivoted to said main frame, a bell-crank lever pivoted to said wrist-plate, a post on said main frame, an intermediate lever pivoted on said post, a second detent pivoted to said post and engaging said intermediate lever, both of said detents engaging the teeth of said traveling frame, said bell-crank lever lying in the path of movement of said first-named lever, a vertically-movable frame mounted on said main frame, a rock-frame pivoted to said main frame, and connections between said rock-frame and said vertically-movable frame, the lower end of said first-named lever contacting with said rock-frame.

32. In an indicator, a main frame, a traveling frame carried thereby and provided with a pair of slots, a pair of combs on opposite sides of said main frame, each comb lying slightly above said traveling frame, a series of cards in said combs resting upon said traveling frame, another pair of combs on opposite sides of the lower part of said main frame, and means for propelling said traveling frame and bringing said slots into register step by step with the teeth of the upper pair of combs.

33. In an indicator, a main frame, a traveling frame slidably mounted thereon and provided with a pair of opposite slots, said traveling frame being provided with a series of teeth, a series of cards supported by said traveling frame, a bracket carried by said main frame, a lever pivoted to said bracket, a wrist-plate pivoted to said main frame, a slide carried by said wrist-plate, a projection from said slide, a spring carried by said wrist-plate and bearing against said projection, a bell-crank lever pivoted to said wrist-plate and provided with a toe which bears against the upper end of said slide, a detent formed on one end of said bell-crank lever, another detent connected with said bell-crank lever, and means for operating said bell-crank lever, rocking said wrist-plate, advancing said detents and thereby said traveling frame and allowing said cards to drop sequentially.

34. In an indicator, a main frame, a traveling frame slidably mounted thereon and provided with a pair of opposite slots, said traveling frame being provided with a series of teeth, a series of cards supported by said traveling frame, a bracket carried by said main frame, a lever pivoted to said bracket, a wrist-plate pivoted to said main frame, a slide carried by said wrist-plate, a projection from said slide, a spring carried by said wrist-plate and bearing against said projection, a bell-crank lever pivoted to said wrist-plate and provided with a toe which bears against the upper end of said slide, a detent formed on one end of said bell-crank lever, another detent connected with said bell-crank lever, means for operating said bell-crank lever, rocking said wrist-plate, advancing said detents and thereby said traveling frame and allowing said cards to drop sequentially, and means for restoring said cards to their original positions.

35. In an indicator, a main frame, a traveling frame slidably mounted thereon and provided with a pair of opposite slots, said traveling frame being provided with a series of teeth, a series of cards supported by said traveling frame, a bracket carried by said main frame, a lever pivoted to said bracket, a wrist-plate pivoted to said main frame, a slide carried by said wrist-plate, a projection from said slide, a spring carried by said wrist-plate and bearing against said projection, a bell-crank lever pivoted to said wrist-plate and provided with a toe which bears against the upper end of said slide, a detent formed on one end of said bell-crank lever, another detent connected with said bell-crank lever, means for operating said bell-crank lever, rocking said wrist-plate, advancing said detents and thereby said traveling frame and allowing said cards to drop sequentially, a vertically-movable frame mounted on said main frame, and means connecting said first-named lever with said vertically-movable frame whereby the latter is operated.

36. In an indicator, a main frame, a traveling frame slidably mounted thereon and provided with a pair of opposite slots, said traveling frame being provided with a series of teeth, a series of cards supported by said traveling frame, a bracket carried by said main frame, a lever pivoted to said bracket, a wrist-plate pivoted to said main frame, a slide carried by said wrist-plate, a projection from said slide, a spring carried by said wrist-plate and bearing against said projection, a bell-crank lever pivoted to said wrist-plate and provided with a toe which bears against the upper end of said slide, a detent formed on one end of said bell-crank lever, another detent connected with said bell-crank lever, means for operating said bell-crank lever, rocking said wrist-plate, advancing said detents and thereby said traveling frame and allowing said cards to drop sequentially, means for restoring said cards to their original position, a vertically-movable frame mounted on said main frame, a rock-frame mounted on said main frame, links connecting said rock-frame with said vertically-movable frame, a portion of said rock-frame lying in the path of movement of said first-named lever.

37. In an indicator, a main frame, a traveling frame slidably mounted on said main frame and provided with a pair of slots, a series of cards supported on said traveling frame, said traveling frame being provided with teeth, a bracket on said main frame, a pair of levers pivoted to said bracket, a wrist-plate pivoted to said main frame, a pair of bell-crank levers each being provided with a detent on one end, a pair of posts on said main frame, a detent pivoted to each post, both of said detents engaging the teeth of said traveling frame, each set of detents being connected with its adjacent bell-crank lever, each bell-crank lever lying in the path of movement of its adjacent first-named lever.

38. In an indicator, a main frame, a traveling frame slidably mounted on said main frame, and provided with a pair of slots, a series of cards supported on said traveling frame, said traveling frame being provided with teeth, a bracket on said main frame, a pair of levers pivoted to said bracket, a wrist-plate pivoted to said main frame, a pair of bell-crank levers each being provided with a detent on one end, a pair of posts on said main frame, a detent pivoted to each post, both of said detents engaging said teeth, each set of detents being connected with its adjacent bell-crank lever, each bell-crank lever lying in the path of movement of its adjacent first-named lever, a vertically-movable frame mounted on said main frame, a rock-frame pivoted to said main frame and connected to said vertically-movable frame, a portion of said rock-frame being in contact with both of said first-named pair of levers.

39. In an indicator, a main frame, a traveling frame mounted thereon and provided with a pair of slots, a series of cards supported by said traveling frame, a pair of links pivoted to the upper end of the main frame, and inclosing said cards, and means to propel said traveling frame along said cards.

40. In an indicator, a main frame, a traveling frame mounted thereon and provided with a pair of slots, a series of cards supported by said traveling frame, said cards being provided with shoulders on each end and having a considerable amount of their center portions cut away, and means for propelling said traveling frame and allowing said cards to drop sequentially, a vertically-movable frame under said cards comprising opposite bars extending along away below the shoulders of the cards, and means for raising said movable frame and bringing the upper edge thereof on a line with the shoulders of the cards.

41. In an indicator, a main frame, a traveling frame slidably mounted thereon and provided with a pair of opposite slots, said traveling frame being provided with a series of teeth, a series of cards supported by said traveling frame, a bracket carried by said main frame, a lever pivoted to said bracket, a wrist-plate pivoted to said main frame, a slide carried by said wrist-plate, a projection from said slide, a spring carried by said wrist-plate and bearing against said projection, a bell-crank lever pivoted to said wrist-plate and provided with a toe which bears against the upper end of said slide, a detent formed on one end of said bell-crank lever, another detent connected with said bell-crank lever, means for operating said bell-crank lever, rocking said wrist-plate, advancing said detents, and thereby said traveling frame, and allowing said cards to drop sequentially, means for restoring said cards to their original position, a vertically-movable frame mounted on said main frame, a rock-frame mounted on said main frame, links connecting said rock-frame with said vertically-movable frame, a portion of said rock-frame lying in the path of movement of said first-named lever, in combination with a pair of wheels and an axle, journals mounted on the axles, a pair of guides connected with the journal, a frame carried by the journal, an L-shaped lever pivoted to said frame, one end of said L-shaped lever projecting below the lowest point of the wheel, the other end of said lever projecting between said pair of guides, and a flexible connection from said L-shaped lever to said first-named lever which is pivoted on the bracket.

42. In an indicator, a box having an open bottom, a plate having a slot and covering the opening, and means for actuating said plate.

43. In an indicator, a box having an open bottom, a plate having a slot and covering the opening, and means for actuating said plate step by step.

44. In an indicator, in combination with a series of cards and means for exposing said cards, a box inclosing said cards and means, said box having an open bottom, a plate having a slot and covering the opening, and means for actuating the plate.

45. In an indicator, a main frame, a traveling frame carried by said main frame, a series of cards supported by said traveling frame, said traveling frame being provided with a pair of opposite slots, means to slide said traveling frame and bring said slots under said cards step by step, a box inclosing said named elements, said box having an opening at the bottom, a plate connected to said traveling frame and covering the opening, said plate having a slot substantially in line with the slots in the traveling frame.

In testimony whereof I have signed my name to this specification, in the presence of two subscribing witnesses, at Los Angeles, in the county of Los Angeles and State of California, this 30th day of September, 1902.

RUDOLPH BOSSHARD.

Witnesses:
GEORGE T. HACKLEY,
JAMES R. TOWNSEND.